(12) United States Patent
Watanabe et al.

(10) Patent No.: US 7,191,760 B2
(45) Date of Patent: Mar. 20, 2007

(54) IGNITION CONTROL METHOD AND IGNITION CONTROL DEVICE FOR TWO-CYCLE INTERNAL COMBUSTION ENGINE

(75) Inventors: Yoshiki Watanabe, Numazu (JP); Tsuneaki Endou, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 42 days.

(21) Appl. No.: 11/110,474

(22) Filed: Apr. 20, 2005

(65) Prior Publication Data

US 2005/0235956 A1 Oct. 27, 2005

(30) Foreign Application Priority Data

Apr. 21, 2004 (JP) .............................. 2004-125174

(51) Int. Cl.
*F02P 5/00* (2006.01)
*F02P 5/06* (2006.01)
(52) U.S. Cl. .............................. 123/406.24; 123/406.55
(58) Field of Classification Search ........... 123/406.21, 123/406.24, 406.29, 406.37, 406.52, 406.55, 123/406.26, 198 D
See application file for complete search history.

(56) References Cited

U.S. PATENT DOCUMENTS

| | | | | |
|---|---|---|---|---|
| 4,449,367 A | * | 5/1984 | Moriguchi et al. | 60/602 |
| 4,523,567 A | * | 6/1985 | Iwata | 123/406.36 |
| 6,234,147 B1 | * | 5/2001 | Hirakata et al. | 123/406.51 |
| 6,371,082 B1 | * | 4/2002 | Spaulding | 123/406.44 |
| 6,513,495 B1 | * | 2/2003 | Franke et al. | 123/406.29 |
| 6,550,450 B2 | * | 4/2003 | Spaulding | 123/406.44 |
| 6,807,941 B2 | * | 10/2004 | Galtier | 123/406.44 |
| 2003/0126860 A1 | * | 7/2003 | Uraki et al. | 60/602 |

FOREIGN PATENT DOCUMENTS

JP 06-108955 4/1994

* cited by examiner

*Primary Examiner*—Mahmoud Gimie
(74) *Attorney, Agent, or Firm*—Pearne & Gordon LLP

(57) ABSTRACT

An ignition control device for a two-cycle internal combustion engine that controls an ignition timing for inhibiting detonation while inhibiting an increase in an exhaust pipe temperature, including: map storing means for storing a map that provides a relationship among a throttle valve opening degree and a rotational speed of the internal combustion engine and a delay side allowable limit ignition timing, which is a limit ignition timing on a delay side of the internal combustion engine when the exhaust pipe temperature of the internal combustion engine reaches an allowable upper limit value; arithmetical operation means for arithmetically operating the limit ignition timing by searching the map with respect to the throttle valve opening degree and the rotational speed of the internal combustion engine; and ignition operation stopping means for stopping an ignition operation of the internal combustion engine when an ignition timing of the internal combustion engine is further delayed from the limit ignition timing.

3 Claims, 5 Drawing Sheets

IGNITION CONTROL METHOD AND IGNITION CONTROL DEVICE FOR TWO-CYCLE INTERNAL COMBUSTION ENGINE

TECHNICAL FIELD OF THE INVENTION

The present invention relates to an ignition control method for a two-cycle internal combustion engine for controlling an ignition timing in order to inhibit detonation in the two-cycle internal combustion engine, and an ignition control device used for performing the ignition control method.

BACKGROUND OF THE INVENTION

In a two-cycle internal combustion engine, occurrence of detonation (abnormal combustion) is inhibited by delaying an ignition timing from an ignition timing in a normal state when detonation occurs, and the ignition timing is returned to the timing in the normal state when the detonation does not occur any longer.

In the two-cycle internal combustion engine, air-fuel mixture in a cylinder is ignited by an ignition plug, then a flame propagates in a combustion chamber. In a process where the flame propagates in the combustion chamber, burned gas compresses unburned gas in the surroundings to excessively increase pressure of the unburned gas. When a temperature of the unburned gas is increased by the pressure increase and radiant heat from the flame, self-ignition of the unburned gas is caused and thus explosive abnormal combustion in the cylinder occurs. Such a phenomenon is referred to as detonation or knocking and causes damage to the engine. Because this phenomenon occurs when the amount of advance of an ignition timing is large or when an air-fuel ratio of the air-fuel mixture goes lean and a cooling effect of a piston by latent heat of evaporation of fuel is thus weak, the phenomenon can be inhibited by delaying the ignition timing or controlling the air-fuel ratio to a rich side, and generally, an ignition timing in a normal state is set to a delay side in view of variation in the air-fuel ratio. In the two-cycle internal combustion engine, however, a maximum output is obtained in a state immediately before the detonation occurs or a state where the detonation occurs to some extent, and thus high performance of the engine cannot be achieved by setting the ignition timing to the delayed side.

Thus, in a high-performance two-cycle internal combustion engine used in a motorcycle or a snowmobile, an ignition timing is set so that an engine is operated in a state immediately before detonation occurs or a state where the detonation occurs to some extent, and detonation inhibition control is performed to protect the engine. In the detonation inhibition control, control is performed so that when detonation is detected, an ignition timing is delayed to reduce indicated means effective pressure (IMEP) and thus inhibit occurrence of the detonation, and when the occurrence of the detonation stops, the ignition timing is advanced. Such control inhibits the occurrence of the detonation and allows high performance of the engine to be achieved without sacrificing an output of the engine. An ignition control method for controlling to delay an ignition timing at the occurrence of detonation in order to inhibit the occurrence of the detonation is disclosed in, for example, Japanese Patent Application Laid Open Publication No. 6-108955.

In the two-cycle internal combustion engine, an exhaust pipe is designed to have a shape such that a pressure wave of exhaust gas is reflected in the exhaust pipe, and unburned gas blowing through in a scavenging stroke is pushed back toward a cylinder by the reflected pressure wave, thereby increasing a charging efficiency into the cylinder. The exhaust gas pressure wave propagates in the exhaust pipe by an acoustic velocity, and thus the effect of increasing the charging efficiency into the cylinder by the reflected exhaust gas pressure wave (hereinafter referred to as an exhaust pipe effect) is influenced by an acoustic velocity change resulting from an exhaust pipe temperature change.

The amount of fuel supplied to the two-cycle internal combustion engine is decided assuming that an exhaust pipe temperature is within an assumed range and that the exhaust pipe effect serves effectively to increase the charging efficiency. Thus, if the exhaust pipe temperature increases beyond the assumed range, the large amount of unburned gas blowing through remains in the exhaust pipe, and burns in the exhaust pipe. When the unburned gas burns in the exhaust pipe to increase the exhaust pipe temperature, the exhaust pipe effect is lost to increase the unburned gas remaining in the exhaust pipe, thereby further increasing the exhaust pipe temperature. In the two-cycle internal combustion engine, if the unburned gas burns in the exhaust pipe to increase the exhaust pipe temperature beyond the assumed temperature range, positive feedback may be applied to the increase in the exhaust pipe temperature, thereby causing the exhaust pipe temperature to abnormally increase.

Generally in a two-cycle internal combustion engine, an exhaust gas temperature increases when an ignition timing is delayed. Thus, in a two-cycle internal combustion engine that performs detonation inhibition control for delaying an ignition timing at the occurrence of detonation in order to inhibit detonation, the detonation inhibition control is continuously performed or repeatedly performed at short time intervals to overheat an exhaust pipe, which may cause an accident such as a fire or reduce the life of the exhaust pipe.

SUMMARY OF THE INVENTION

Therefore, the invention has an object to provide an ignition control method for a two-cycle internal combustion engine that inhibits an exhaust pipe from being overheated when detonation inhibition control is performed, and an ignition control device used for performing the ignition control method.

The invention is applied to an ignition control method for a two-cycle internal combustion engine that performs detonation inhibition control for delaying an ignition timing of the internal combustion engine at the occurrence of detonation in order to inhibit occurrence of detonation in the internal combustion engine.

The inventor has found the following: When the engine is operated in a state where an exhaust pipe effect has little influence on a charging efficiency, a delay of an ignition timing for inhibiting detonation does not cause an exhaust pipe temperature to exceed an assumed range and does not cause the exhaust pipe temperature to abnormally increase, while when the engine is operated in a state where the exhaust pipe effect significantly contributes to an increase in the charging efficiency, the delay of the ignition timing for inhibiting detonation causes the exhaust pipe temperature to abnormally increase and exceed an allowable upper limit value when the amount of delay exceeds an allowable range; and an operation state where the exhaust pipe temperature significantly contributes to the increase in the charging efficiency (an operation state where the delay of the ignition timing may cause the exhaust pipe temperature to exceed the allowable upper limit value) can be determined by a throttle value opening degree and a rotational speed of the engine.

Thus, in the invention, while the detonation inhibition control is performed, it is estimated from a throttle value opening degree and a rotational speed of the internal combustion engine whether the internal combustion engine is in an operation state where a delay of the ignition timing may cause an exhaust pipe temperature to exceed an allowable upper limit value, and an ignition operation of the internal combustion engine is stopped when it is estimated that the internal combustion engine is in the operation state where the exhaust pipe temperature may exceed the allowable upper limit value.

Such control allows the ignition operation to stop to reduce the exhaust pipe temperature when the exhaust pipe temperature of the engine may abnormally increase while the detonation inhibition control for delaying the ignition timing at the occurrence of detonation is performed, thereby inhibiting an accident such as a fire resulting from the abnormal increase in the exhaust pipe temperature or reduction in the life of the exhaust pipe.

In a preferable aspect of the invention, a map is prepared that provides a relationship among a throttle valve opening degree and a rotational speed of the internal combustion engine and a delay side allowable limit ignition timing, which is an ignition timing on a delay side of the internal combustion engine when an exhaust pipe temperature of the internal combustion engine reaches an allowable upper limit value. Then, while the detonation inhibition control is performed, an allowable limit ignition timing arithmetical operation step of arithmetically operating the delay side allowable limit ignition timing is performed by searching the map with respect to the throttle valve opening degree and the rotational speed of the internal combustion engine, and an ignition operation of the internal combustion engine is stopped when the ignition timing is further delayed from the delay side allowable limit ignition timing in the detonation inhibition control.

An ignition control device for a two-cycle internal combustion engine used for performing the ignition control method includes detonation inhibition control means for controlling to delay an ignition timing of the internal combustion engine at the occurrence of detonation in order to inhibit the occurrence of the detonation.

In the invention, the detonation inhibition control means includes: map storing means for storing a map that provides a relationship among a throttle valve opening degree and a rotational speed of the internal combustion engine and a delay side allowable limit ignition timing, which is a limit ignition timing on a delay side of the internal combustion engine when an exhaust pipe temperature of the internal combustion engine reaches an allowable upper limit value; throttle valve opening degree detection means for detecting the throttle valve opening degree of the internal combustion engine; rotational speed detection means for detecting the rotational speed of the internal combustion engine; allowable limit ignition timing arithmetical operation means for arithmetically operating the delay side allowable limit ignition timing by searching the map with respect to the throttle valve opening degree detected by the throttle valve opening degree detection means and the rotational speed detected by the rotational speed detection means; and ignition operation stopping means for stopping an ignition operation of the internal combustion engine when the ignition timing of the internal combustion engine is further delayed from the delay side allowable limit ignition timing.

As described above, it can be estimated from the throttle value opening degree and the rotational speed of the internal combustion engine whether the engine is in an operation state where an exhaust pipe effect is lost when the ignition timing is delayed and the exhaust pipe temperature may abnormally increase. An allowable limit ignition timing on the delay side when the internal combustion engine is in an operation state where the delay of the ignition timing may cause the exhaust pipe temperature to abnormally increase is determined depending on the degree of influence of the exhaust pipe effect on the increase in charging efficiency. When the engine is operated in a state where the exhaust pipe effect has no influence on the charging efficiency, a relatively large amount of delay of the ignition timing causes no abnormal increase in the exhaust pipe temperature, while when the engine is operated in a state where the exhaust pipe effect has a significant influence on the increase in the charging efficiency, the large amount of delay of the ignition timing tends to cause the exhaust pipe temperature to abnormally increase.

Thus, the delay side allowable limit ignition timing that must not be exceeded for operating the engine without the abnormal increase in the exhaust pipe temperature can be estimated from the throttle valve opening degree and the rotational speed of the engine. The relationship among the throttle valve opening degree and the rotational speed as well as the delay side allowable limit ignition timing can be obtained by an experiment, and a three-dimensional map that provides the relationship among the throttle valve opening degree and the rotational speed of the engine and the delay side allowable limit ignition timing can be prepared based on the experiment. With such a map, the delay side allowable limit ignition timing can be obtained by searching the map with respect to the throttle valve opening degree and the rotational speed, thereby facilitating control to inhibit the exhaust pipe temperature from abnormally increasing in the detonation inhibition control.

In the two-cycle internal combustion engine, the upper limit value of the allowable range of the exhaust pipe temperature that needs to be maintained for operating the engine without losing the exhaust pipe effect has a correlation with the throttle valve opening degree and the rotational speed of the engine. Thus, a relationship among the throttle valve opening degree and the rotational speed of the engine and the allowable upper limit value of the exhaust pipe temperature required for maintaining the exhaust pipe effect can be obtained by the experiment. A three-dimensional map that provides the relationship among the throttle valve opening degree and the rotational speed as well as the allowable upper limit value of the exhaust pipe temperature can be prepared from the relationship, and the allowable upper limit value of the exhaust pipe temperature can be arithmetically operated by searching the map with respect to each throttle valve opening degree and each rotational speed of the engine. If control to delay the ignition timing is performed in order to inhibit detonation when the exhaust pipe temperature of the internal combustion engine exceeds the allowable upper limit value, the exhaust pipe temperature further increases to lose the exhaust pipe effect, thereby causing the exhaust pipe temperature to abnormally increase.

Thus, in another preferable aspect of the invention, means for detecting an exhaust pipe temperature of an internal combustion engine is provided, and a map is prepared that provides a relationship among a throttle valve opening degree and a rotational speed of the internal combustion engine and an allowable upper limit value of the exhaust pipe temperature, which is an upper limit value of an exhaust pipe temperature range that allows control to delay an ignition timing without abnormal increase in the exhaust pipe temperature. Then, while the detonation inhibition control is performed, an allowable upper limit temperature arithmetical operation step of arithmetically operating the allowable upper limit value of the exhaust pipe temperature is performed by searching the map with respect to the throttle valve opening degree and the rotational speed of the internal combustion engine, and an ignition operation of the internal combustion engine is stopped when an exhaust pipe temperature detected by the exhaust pipe temperature detection means exceeds the allowable upper limit value of the exhaust pipe temperature arithmetically operated in the allowable upper limit temperature arithmetical operation step.

Such control allows the ignition operation to stop to reduce the exhaust pipe temperature when the exhaust pipe temperature may abnormally increase in the detonation inhibition control, thereby inhibiting the exhaust pipe temperature from abnormally increasing when the detonation inhibition control is performed.

In an ignition control device for a two-cycle internal combustion engine used for performing the ignition control method, the detonation inhibition control means includes: exhaust pipe temperature detection means for detecting an exhaust pipe temperature of the internal combustion engine; throttle valve opening degree detection means for detecting a throttle valve opening degree of the internal combustion engine; rotational speed detection means for detecting a rotational speed of the internal combustion engine; map storing means for storing a map that provides a relationship among the throttle valve opening degree and the rotational speed of the internal combustion engine and an allowable upper limit value of the exhaust pipe temperature, which is an upper limit value of an exhaust pipe temperature range that allows control to delay an ignition timing without abnormal increase in the exhaust pipe temperature; allowable upper limit temperature arithmetical operation means for arithmetically operating the allowable upper limit value of the exhaust pipe temperature of the internal combustion engine by searching the map with respect to the throttle valve opening degree detected by the throttle valve opening degree detection means and the rotational speed detected by the rotational speed detection means; and ignition operation stopping means for stopping an ignition operation of the internal combustion engine when the exhaust pipe temperature detected by the exhaust pipe temperature detection means exceeds the allowable upper limit value arithmetically operated by the allowable upper limit temperature arithmetical operation means.

As described above, according to the invention, while the detonation inhibition control for delaying the ignition timing at the occurrence of the detonation is performed, it is estimated from the throttle value opening degree and the rotational speed of the internal combustion engine whether the internal combustion engine is in an operation state where the delay of the ignition timing may cause the exhaust pipe temperature to exceed the allowable upper limit value, and the ignition operation of the internal combustion engine is stopped to reduce the exhaust pipe temperature when it is estimated that the internal combustion engine is in the operation state where the exhaust pipe temperature exceeds the allowable upper limit value. This inhibits an accident such as a fire resulting from the abnormal increase in the exhaust pipe temperature at the occurrence of the detonation or reduction in the life of the exhaust pipe.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF THE PREFERRED EMBODIMENTS

Now, preferred embodiments of the invention will be described in detail with reference to the drawings.

Figure 1:
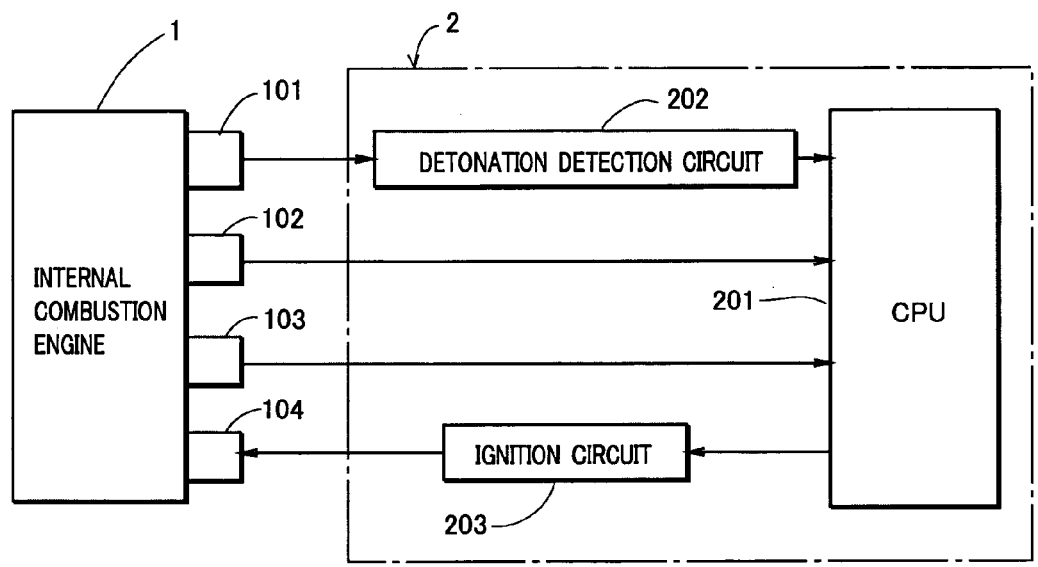
FIG. 1 is a schematic view of a construction of a hardware of a control device according to a first embodiment of the invention.

FIG. 1 schematically shows a construction of a hardware used in an embodiment of the invention. In FIG. 1, a reference numeral 1 denotes a two-cycle internal combustion engine, and 2 denotes an electronic control unit (ECU) that controls the internal combustion engine 1. To the internal combustion engine 1, a detonation sensor 101 constituted by a seated combustion pressure sensor (GPS), a knock sensor or the like, a pulser (a pulse signal generator) 102 that outputs a pulse signal when a rotational angle position of a crankshaft of the engine matches a predetermined position, a throttle sensor 103, and an ignition coil 104 are connected. The pulser 102 detects a leading edge and a trailing edge in a rotational direction of a reluctor provided in a rotor that rotates in synchronism with the engine to generate a reference pulse and a low speed state ignition timing detection pulse having a different polarity between a reference crank angle position set in a position sufficiently advanced from a crank angle position (referred to as a top dead center position) where a piston in a particular cylinder of the engine reaches top dead center and a crank angle position (a crank angle position slightly advanced from the top dead center) appropriate for a position for an ignition operation at a start and a low speed operation of the engine.

Figure 3:
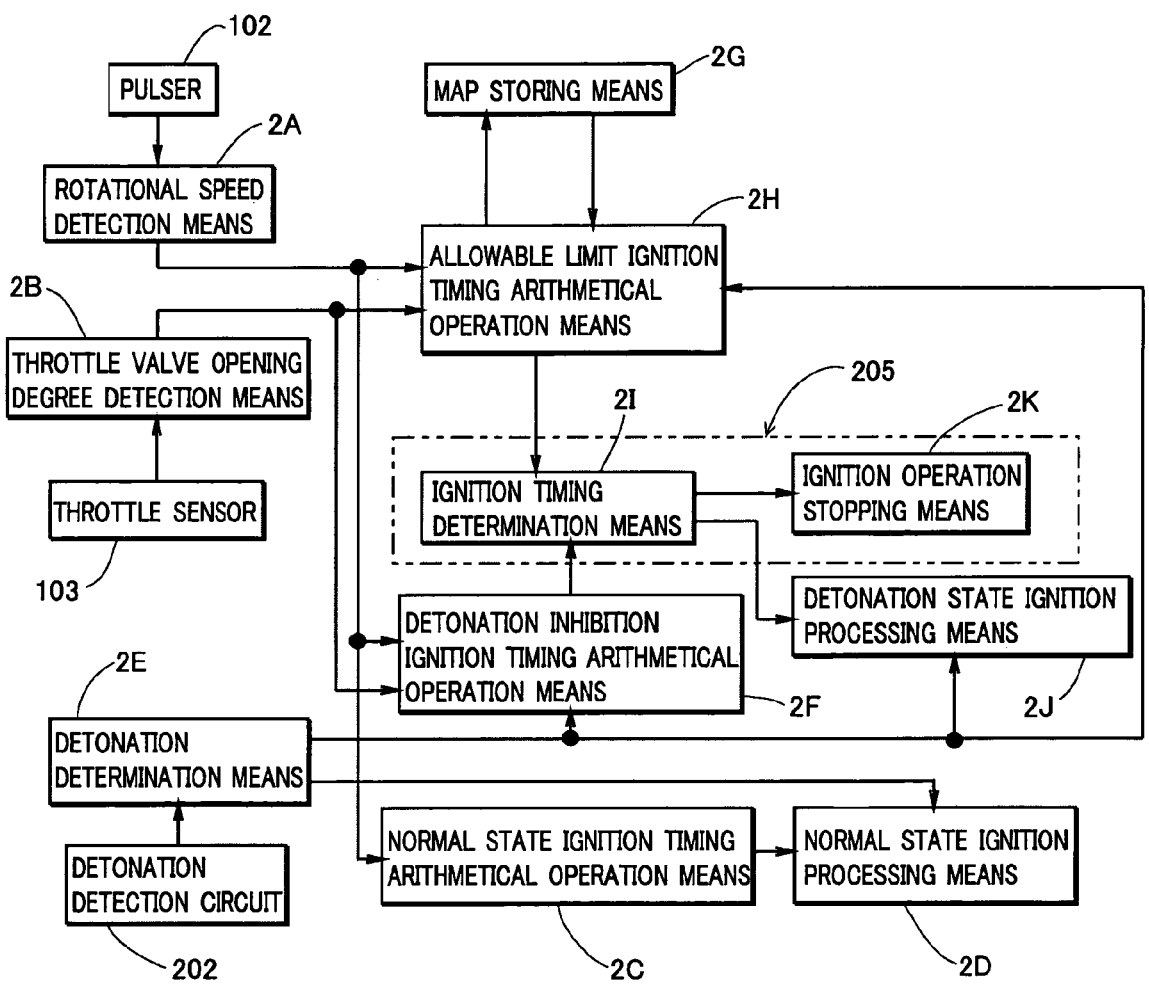
FIG. 3 is a block diagram of a whole construction including various means constructed by a microprocessor of the control device according to the first embodiment of the invention.

In the control unit 2, a microprocessor 201, a detonation detection circuit 202 that draws a signal in a frequency band appropriate for detecting detonation from an output of the detonation sensor 101, and an ignition circuit 203 are provided, and an output of the detonation detection circuit 202, an output of the signal generator 102, and an output of the throttle sensor 103 are input to the microprocessor 201. The microprocessor 201 constructs various means in FIG. 3 by executing predetermined programs.

For the various means constructed by the microprocessor executing the predetermined programs, rotational speed detection means 2A is means for detecting a rotational speed of the engine from a generation interval of pulses output from the pulser 102. The means is comprised so as to perform a series of processings of measuring the generation interval of the pulses generated by the pulser 102 at a predetermined crank angle position to obtain rotational speed detection time data, and detecting the rotational speed of the engine from the time data (time required for a crankshaft to rotate through a certain angle).

Throttle valve opening degree detection means 2B is means for detecting a throttle valve opening degree of the engine, and obtains an A/D conversion value of the output of the throttle sensor 103 that outputs an electric signal proportional to the throttle valve opening degree.

Normal state ignition timing arithmetical operation means 2C is means for arithmetically operating an ignition timing in a normal state (where no detonation occurs) of the engine with respect to the rotational speed detected by the rotational speed detection means 2A. The arithmetical operation of the ignition timing in the normal state of the engine is performed by using, for example, an ignition timing arithmetical operation map that provides a relationship between the rotational speed and the ignition timing. The ignition timing of the engine is arithmetically operated in the form of time data (ignition timing measurement time data) measured by an ignition timer while the engine rotates from a reference position where the pulser 102 generates a reference pulse to a crank angle position (an ignition position) corresponding to the ignition timing.

In the shown example, the ignition timing in the normal state is arithmetically operated with respect to the rotational speed, but the ignition timing is sometimes arithmetically operated with respect to the rotational speed and another control condition (for example, a throttle valve opening degree), or the ignition timing in the normal state is sometimes arithmetically operated by correcting the ignition timing arithmetically operated with respect to the rotational speed according to another control condition.

Normal state ignition processing means 2D is means for performing a processing of detecting the ignition timing arithmetically operated by the normal state ignition timing arithmetical operation means 2C to provide an ignition instruction. The processing means is comprised so as to perform a processing of setting the ignition timing measurement time data arithmetically operated by the ignition timing arithmetical operation means 2C when the pulser 102 generates the reference pulse to the ignition timer provided in the microprocessor to start the measurement, and a processing of providing the ignition instruction to the ignition circuit 203 when the ignition timer completes the measurement of the set ignition timing measurement time data.

Detonation determination means 2E is means for performing a processing for determining from the output of the detonation detection circuit 202 whether detonation occurs. The determination means compares a level of a detonation detection signal obtained from the detonation detection circuit 202 with a set value, and determines that the detonation occurs when the level of the detonation detection signal is equal to or higher than the set value and that no detonation occurs when the level of the detonation detection signal is lower than the set value.

Detonation inhibition ignition timing arithmetical operation means 2F is means for arithmetically operating an ignition timing delayed from the ignition timing in the normal state as a detonation inhibition ignition timing in order to inhibit detonation when the detonation determination means 2E determines that the detonation occurs. The detonation inhibition ignition timing is arithmetically operated by, for example, correcting the ignition timing in the normal state according to the level of the detonation detection signal obtained from the detonation detection circuit.

Map storing means 2G is means for storing a delay side allowable limit ignition timing arithmetical operation map that provides a relationship among the throttle valve opening degree and the rotational speed of the internal combustion engine and a delay side allowable limit ignition timing. The storing means is comprised of a ROM or an EEPROM that stores the map that provides the relationship among the throttle valve opening degree and the rotational speed of the internal combustion engine and the delay side allowable limit ignition timing, which is an ignition timing on a delay side of the internal combustion engine when an exhaust pipe temperature of the engine reaches an allowable upper limit value (an upper limit value of an exhaust pipe temperature range that needs to be maintained for operating the engine without losing an exhaust pipe effect).

As described above, the allowable limit ignition timing that is the limit ignition timing on the delay side that must not be exceeded for operating the engine without the abnormal increase in the exhaust pipe temperature can be estimated from the throttle valve opening degree and the rotational speed of the engine. The relationship among the throttle valve opening degree and the rotational speed as well as the delay side allowable limit ignition timing can be obtained by an experiment, and a three-dimensional map that provides the relationship among the throttle valve opening degree and the rotational speed of the engine and the delay side allowable limit ignition timing can be prepared based on the experiment.

Besides the map storing means 2G that stores the delay side allowable limit ignition timing arithmetical operation map, map storing means is provided that stores a different map such as an ignition timing arithmetical operation map used when the ignition timing in the normal state of the engine is arithmetically operated, but map storing means other than the map storing means 2G is not shown.

Allowable limit ignition timing arithmetical operation means 2H is means for arithmetically operating a delay side allowable limit ignition timing by searching the delay side allowable limit ignition timing arithmetical operation map stored in the map storing means 2G with respect to the rotational speed and the throttle valve opening degree of the internal combustion engine.

Ignition timing determination means 2I is means for determining whether the detonation inhibition ignition timing arithmetically operated by the detonation inhibition ignition timing arithmetical operation means 2F is further delayed from the delay side allowable limit ignition timing.

Detonation time ignition processing means 2J is means for performing a processing for providing an ignition instruction at the detonation inhibition ignition timing when the ignition timing determination means 2I determines that the detonation inhibition ignition timing arithmetically operated by the detonation inhibition ignition timing arithmetical operation means 2F is not delayed from the delay side allowable limit ignition timing. The ignition processing means is comprised so as to perform a processing of setting the ignition timing measurement time data arithmetically operated by the detonation inhibition ignition timing arithmetical operation means 2F when the pulser 102 generates the reference pulse to the ignition timer provided in the microprocessor to start the measurement, and a processing of providing the ignition instruction to the ignition circuit 203 when the ignition timer completes the measurement of the set ignition timing measurement time data.

Ignition operation stopping means 2K is means for performing a processing for stopping the ignition operation of the engine when it is determined that the detonation inhibition ignition timing arithmetically operated by the detonation inhibition ignition timing arithmetical operation means 2F is further delayed from the delay side allowable limit ignition timing arithmetically operated by the allowable limit ignition timing arithmetical operation means 2H. The ignition operation stopping means is comprised, for example, so as to perform a processing for forbidding the ignition instruction to be provided to the ignition circuit 203 when it is determined that the detonation inhibition ignition timing is delayed from the delay side allowable limit ignition timing.

In this example, ignition operation stopping means 205 for stopping the ignition operation of the internal combustion engine when the ignition timing of the internal combustion engine is further delayed from the delay side allowable limit ignition timing is comprised of the ignition timing determination means 2I and the ignition operation stopping means 2K.

The ignition circuit 203 provided in the ECU 2 in FIG. 1 is comprised of a known capacitive-discharge ignition circuit or a current-interruption ignition circuit, and controls to abruptly change a primary current of the ignition coil 104 when the ignition instruction is provided from the microprocessor 201 at the ignition timing of the internal combustion engine to induce high voltage for ignition in a secondary coil of the ignition coil 104. The high voltage for ignition is applied to an ignition plug mounted to a cylinder of the internal combustion engine 1, and thus spark discharge occurs in the ignition plug to ignite the engine.

An injector for injecting fuel into an intake pipe and a generator for supplying power to various electrical components, or the like are further mounted to the internal combustion engine 1, and various means for controlling them are provided in the internal combustion engine 1, though not shown.

In the invention, while the detonation inhibition control for delaying the ignition timing at the occurrence of the detonation is performed, it is estimated from the throttle value opening degree and the rotational speed of the internal combustion engine whether the internal combustion engine 1 is in an operation state where the delay of the ignition timing may cause the exhaust pipe temperature to exceed the allowable upper limit value, and an ignition operation of the internal combustion engine is stopped when it is estimated that the internal combustion engine 1 is in an operation state where the exhaust pipe temperature may exceed the allowable upper limit value.

The allowable upper limit value of the exhaust pipe temperature is an exhaust pipe temperature that must not be exceeded for operating the engine without abnormal increase in the exhaust pipe temperature. When the delay of the ignition timing causes the exhaust pipe temperature to exceed the allowable upper limit value, an increase in charging efficiency by an exhaust pipe effect is inhibited to increase the amount of unburned gas remaining in the exhaust pipe, and the unburned gas burns to further increase the temperature in the exhaust pipe. The exhaust pipe effect is lost by the increase in the exhaust pipe temperature to significantly increase the temperature in the exhaust pipe. Thus, it is necessary to inhibit the exhaust pipe temperature from exceeding the allowable upper limit value, and thus, in the invention, the ignition operation of the internal combustion engine is stopped when the exhaust pipe temperature detected by the exhaust pipe temperature detection means exceeds the allowable upper limit value to reduce the exhaust pipe temperature. The allowable upper limit value of the exhaust pipe temperature is experimentally decided.

In the embodiment, the ignition timing on the delay side of the internal combustion engine when the exhaust pipe temperature of the internal combustion engine reaches the allowable upper limit value is obtained as the delay side allowable limit ignition timing. The delay side allowable limit ignition timing differs according to an operation state of the internal combustion engine. The operation state of the engine can be understood by the throttle valve opening degree and the rotational speed of the internal combustion engine. Thus, in the invention, the relationship among the throttle valve opening degree and the rotational speed of the internal combustion engine and the delay side allowable limit ignition timing is previously obtained by an experiment, and the delay side allowable limit ignition timing arithmetical operation map is prepared based on the experimental result. Then, while the detonation inhibition control is performed, an allowable limit ignition timing arithmetical operation step of arithmetically operating the delay side allowable limit ignition timing is performed by searching the map with respect to the throttle valve opening degree and the rotational speed of the internal combustion engine, and the ignition operation of the internal combustion engine is stopped when the ignition timing is further delayed from the delay side allowable limit ignition timing in the detonation inhibition control. When the ignition operation of the internal combustion engine is stopped, the temperature in the exhaust pipe is reduced to recover the exhaust pipe effect. The recovered exhaust pipe effect causes normal detonation inhibition control, returning to a state where an ignition is performed at the ignition timing in the normal state when the detonation is eliminated.

Figure 5:
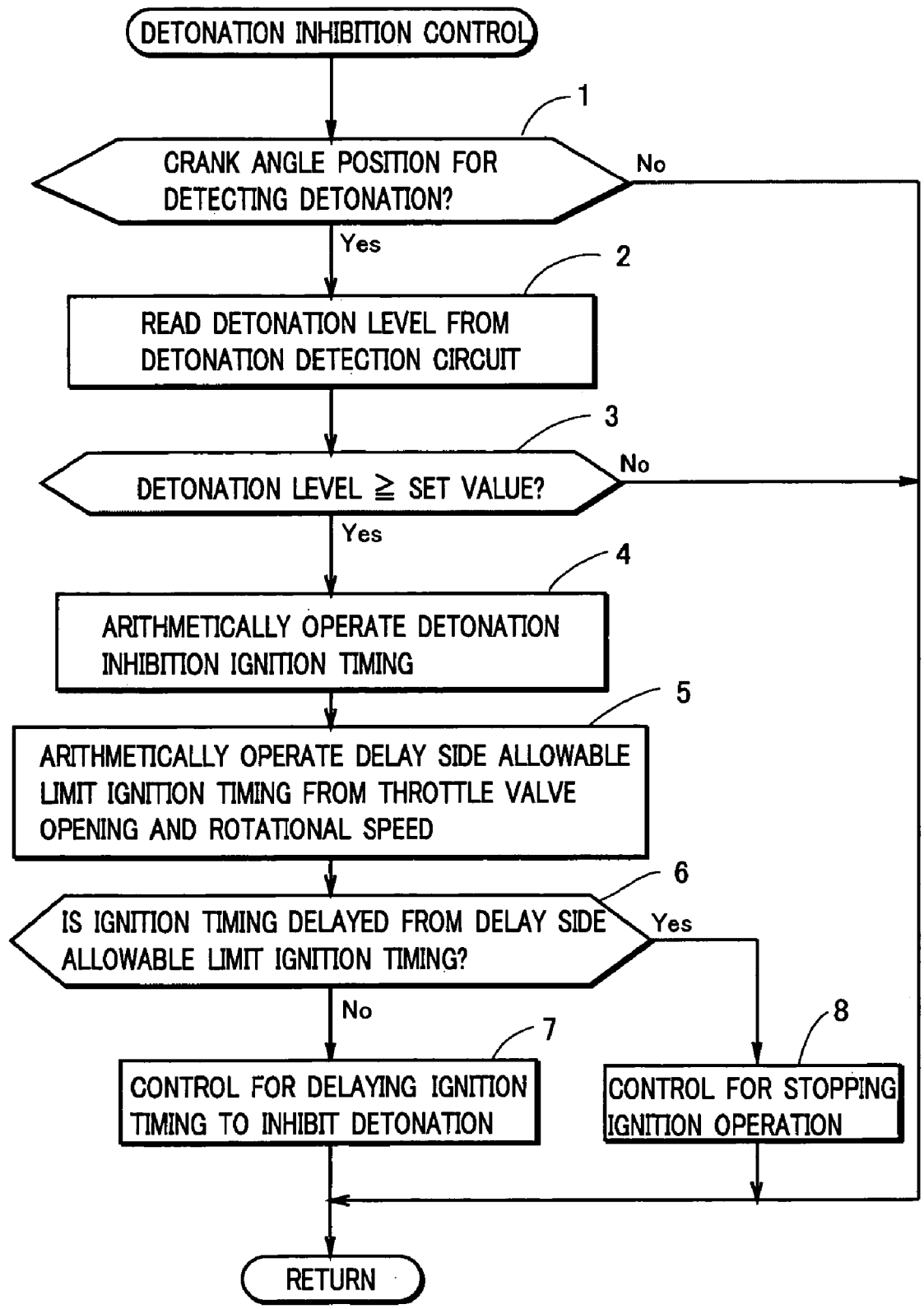
FIG. 5 is a flowchart of an algorithm of a program executed by the microprocessor for performing detonation inhibition control in the first embodiment of the invention.

A flowchart schematically showing an algorithm of a program executed by the microprocessor 201 for performing the detonation inhibition control in the embodiment is shown in FIG. 5. The task in FIG. 5 is executed at minimum time intervals, and when this task is started, first in Step 1, it is determined whether the current crank angle position is a crank angle position for detecting detonation. The determination whether the current crank angle position is the crank angle position for detecting detonation is performed by determining whether the current crank angle position is within a crank angle range where detonation tends to occur. In the two-cycle internal combustion engine, the crank angle range where the detonation tends to occur (a certain angle range from a crank angle position where the ignition operation is performed) is fixed. Thus, a clocking operation for measuring time corresponding to the certain angle from the crank angle position corresponding to the ignition timing is performed by a timer, and it is determined whether the task in FIG. 5 is started while the timer performs the clocking operation, thereby determining whether the current crank angle position is the crank angle position for detecting detonation.

When it is determined in Step 1 that the current crank angle position is not the crank angle position for detecting detonation, no processing is performed thereafter to move to a different task. When it is determined in Step 1 that the current crank angle position is the crank angle position for detecting detonation, the process goes to Step 2, and the level of the detonation detection signal is read from the detonation detection circuit 202. Then in Step 3, it is determined whether the read level of the detonation detection signal is equal to or higher than the set value. When it is determined that the level of the detonation detection signal is not equal to or higher than the set value, no processing is performed thereafter to finish the task.

When it is determined in Step 3 that the level of the detonation detection signal is equal to or higher than the set value, it is determined that detonation occurs, and in Step 4, the detonation inhibition ignition timing is arithmetically operated. Then in Step 5, the allowable limit ignition timing arithmetical operation step is performed of arithmetically operating the delay side allowable limit ignition timing from the throttle valve opening degree and the rotational speed, and in Step 6, it is determined whether the current ignition timing is delayed from the delay side allowable limit ignition timing arithmetically operated. When it is determined that the current ignition timing is not delayed from the delay side allowable limit ignition timing, the process goes to Step 7, and detonation inhibition ignition timing delay control for delaying the ignition timing is performed in order to inhibit the detonation. In this control, clock data for measuring the ignition timing arithmetically operated in Step 4 is set in the ignition timer to start the clocking operation, and an ignition instruction is provided to an ignition circuit when the ignition timer finishes the clocking operation. When it is determined in Step 6 that the current ignition timing is delayed from the delay side allowable limit ignition timing arithmetically operated, the process goes to Step 8, and a processing for stopping the ignition operation is performed.

As described above, the allowable limit ignition timing on the delay side that must not be exceeded for operating the engine without the abnormal increase in the exhaust pipe temperature is obtained with respect to the throttle valve opening degree and the rotational speed of the engine, and the ignition operation is stopped when the ignition timing is further delayed from the delay side allowable limit ignition timing in the detonation inhibition control, thereby inhibiting an excessive delay of the ignition timing to excessively increase the exhaust pipe temperature in the detonation inhibition control, and inhibiting occurrence of a fire resulting from the increase in the exhaust pipe temperature or reduction in the life of the exhaust pipe.

According to the algorithm in FIG. 5, the detonation determination means 2E is configured by Step 3, and the detonation inhibition ignition timing arithmetical operation means 2F is configured by Step 4. The allowable limit ignition timing arithmetical operation means 2H is configured by Step 5, and the ignition timing determination means 2I is configured by Step 6. The detonation state ignition processing means 2J is configured by Step 7, and the ignition operation stopping means 2K is configured by Step 8.

In the two-cycle internal combustion engine, the upper limit value of the allowable range of the exhaust pipe temperature that needs to be maintained for operating the engine without losing the exhaust pipe effect has a correlation with the throttle valve opening degree and the rotational speed of the engine. A three-dimensional map that provides the relationship among the throttle valve opening degree and the rotational speed as well as the allowable upper limit value of the exhaust pipe temperature can be prepared from the relationship, and the allowable upper limit value of the exhaust pipe temperature can be arithmetically operated by searching the map with respect to each throttle valve opening degree and each rotational speed of the engine.

Figure 2:
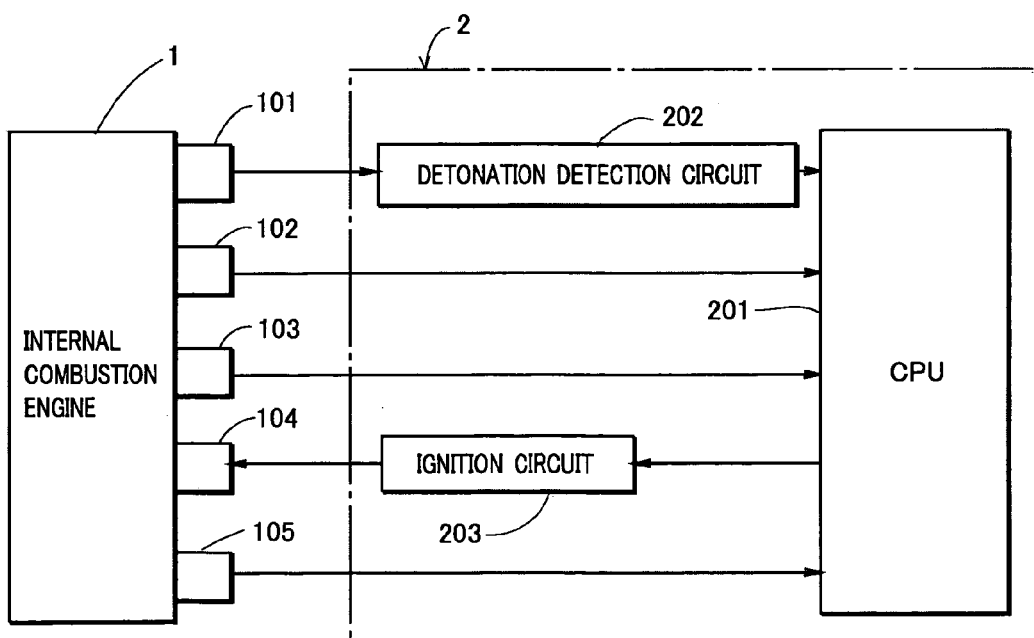
FIG. 2 is a schematic view of a construction of a hardware of a control device according to a second embodiment of the invention.

In a second embodiment of the invention, as shown in FIG. 2, an exhaust gas temperature sensor (exhaust pipe temperature detection means) 105 for detecting a temperature of an exhaust pipe of an internal combustion engine is provided, and a map is prepared that provides a relationship among a throttle valve opening degree and a rotational speed of the internal combustion engine and an allowable upper limit value of an exhaust pipe temperature. While detonation inhibition control is performed, an allowable upper limit temperature arithmetical operation step of arithmetically operating the allowable upper limit value of the exhaust pipe temperature is performed by searching the map with respect to the throttle valve opening degree and the rotational speed of the internal combustion engine, and an ignition operation of the internal combustion engine is stopped when the exhaust pipe temperature detected by the exhaust pipe temperature detection means exceeds the allowable upper limit value of the exhaust pipe temperature arithmetically operated in the allowable upper limit temperature arithmetical operation step. The allowable upper limit value of the exhaust pipe temperature is set to an upper limit value of an exhaust pipe temperature range that allows control to delay an ignition timing without abnormal increase in the exhaust pipe temperature.

Figure 4:
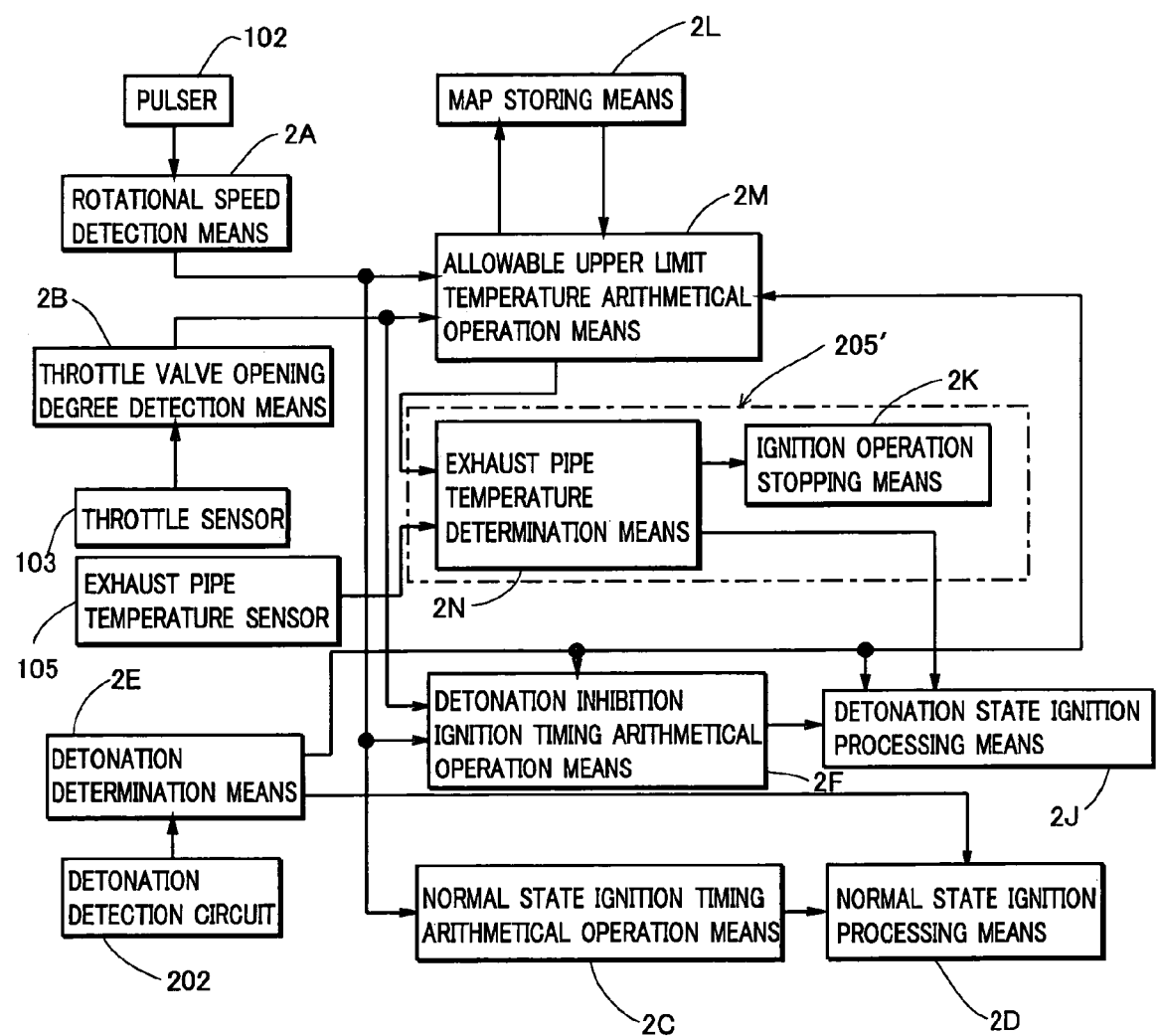
FIG. 4 is a block diagram of a whole construction including various means constructed by a microprocessor of the control device according to the second embodiment of the invention.

In the second embodiment, as shown in FIG. 4, detonation inhibition control means includes: an exhaust pipe temperature sensor (exhaust pipe temperature detection means) 105 for detecting the exhaust pipe temperature of the internal combustion engine; map storing means 2L for storing the map that provides the relationship among the throttle valve opening degree and the rotational speed of the engine and the allowable upper limit value of the exhaust pipe temperature of the engine; allowable upper limit temperature arithmetical operation means 2M for arithmetically operating the allowable upper limit value of the exhaust pipe temperature of the internal combustion engine by searching the map with respect to the throttle valve opening degree of the internal combustion engine detected by the throttle valve opening degree detection means 2B and the rotational speed detected by the rotational speed detection means 2A; exhaust pipe temperature determination means 2N for determining whether the exhaust pipe temperature detected by the exhaust pipe temperature sensor exceeds the allowable upper limit value arithmetically operated by the allowable upper limit temperature arithmetical operation means 2M; detonation state ignition processing means 2J for performing a processing for causing an ignition operation at the ignition timing arithmetically operated by the detonation inhibition ignition timing arithmetical operation means 2F when the determination means determines that the exhaust pipe temperature does not exceed the allowable upper limit value; and ignition operation stopping means 2K for stopping the ignition operation of the internal combustion engine when the exhaust pipe temperature detected by the exhaust pipe temperature sensor exceeds the allowable upper limit value arithmetically operated by the allowable upper limit temperature arithmetical operation means 2M. Other points are the same as in the embodiment in FIGS. 1 and 3.

Figure 6:
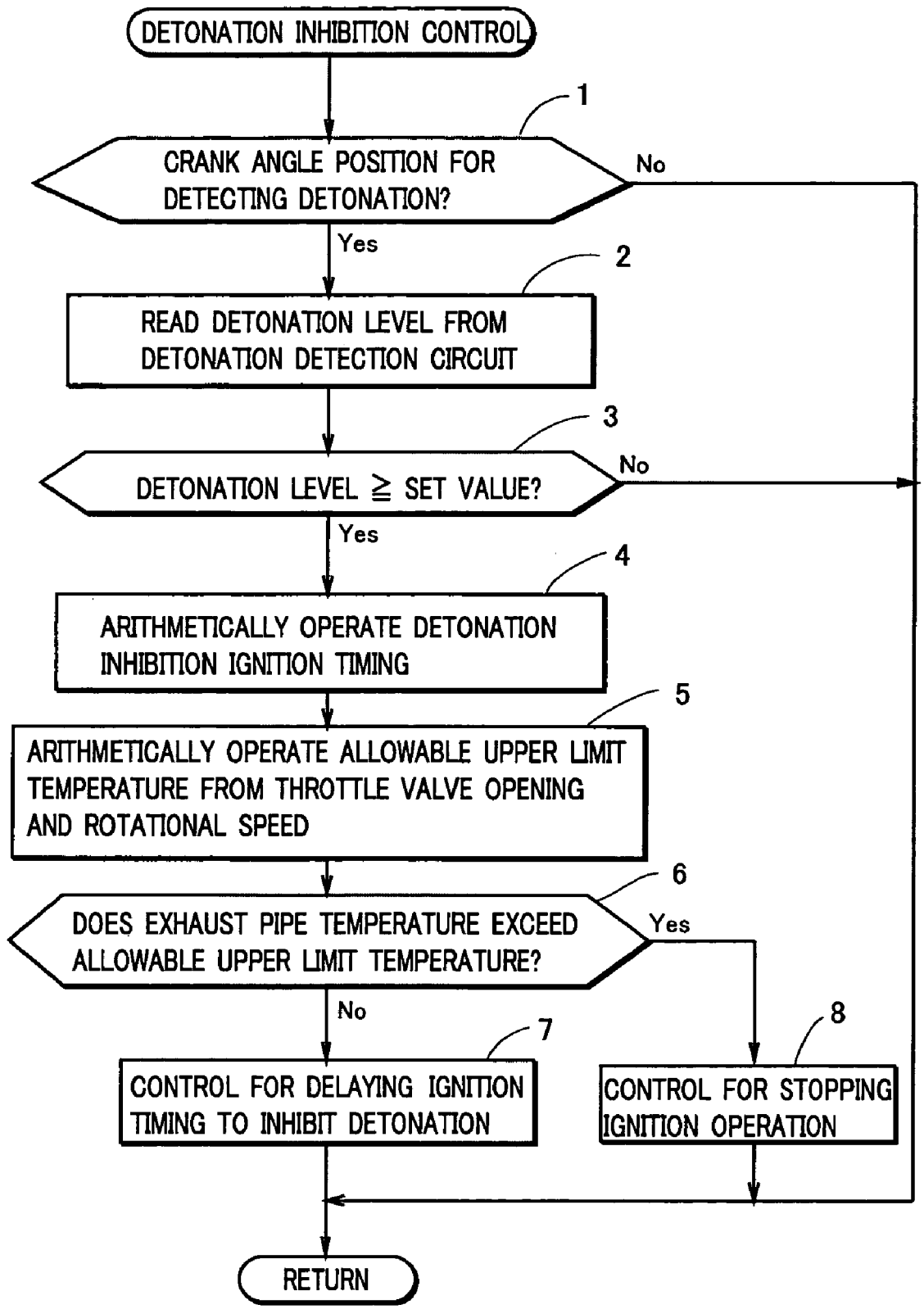
FIG. 6 is a flowchart of an algorithm of a program executed by the microprocessor for performing detonation inhibition control in the second embodiment of the invention.

A flowchart schematically showing an algorithm of a program executed at minimum time intervals by a microprocessor 201 for performing the detonation inhibition control in the second embodiment of the invention is shown in FIG. 6. When the task in FIG. 6 is started, first in Step 1, it is determined whether the current crank angle position is a crank angle position for detecting detonation. When it is determined in Step 1 that the current crank angle position is not the crank angle position for detecting detonation, no processing is performed thereafter to move to a different task. When it is determined in Step 1 that the current crank angle position is the crank angle position for detecting detonation, the process goes to Step 2, and a level of a detonation detection signal is read from a detonation detection circuit 202. Then in Step 3, it is determined whether the read level of the detonation detection signal is equal to or higher than a set value. When it is determined that the level of the detonation detection signal is not equal to or higher than the set value, no processing is performed thereafter to finish the task.

When it is determined in Step 3 that the level of the detonation detection signal is equal to or higher than the set value, it is determined that detonation occurs, and in Step 4, detonation inhibition ignition timing is arithmetically operated. Then in Step 5, the allowable upper limit temperature arithmetical operation step is performed of arithmetically operating the allowable upper limit value of the exhaust pipe temperature from the throttle valve opening degree and the rotational speed, and in Step 6, it is determined whether the current exhaust pipe temperature exceeds the allowable upper limit value. When it is determined that the current exhaust pipe temperature is equal to or lower than the allowable upper limit value, the process goes to Step 7, and detonation inhibition ignition timing delay control for delaying the ignition timing is performed in order to inhibit the detonation. When it is determined in Step 6 that the current exhaust pipe temperature exceeds the allowable upper limit value, the process goes to Step 8, and a processing for stopping the ignition operation is performed.

As described above, the allowable upper limit value of the exhaust pipe temperature, which is the upper limit value of the exhaust pipe temperature range that allows the control to delay the ignition timing without abnormal increase in the exhaust pipe temperature, is obtained with respect to the throttle valve opening degree and the rotational speed of the internal combustion engine, and the ignition operation of the internal combustion engine is stopped when the exhaust pipe temperature detected by the exhaust pipe temperature sensor exceeds the allowable upper limit value. Thus, when the delay of the ignition timing may cause the exhaust pipe temperature to abnormally increase while the detonation inhibition control is performed, the ignition operation can be stopped to reduce the exhaust pipe temperature, thereby allowing the detonation inhibition control to be performed without the excessive increase in the exhaust pipe temperature.

According to the algorithm in FIG. 6, the detonation determination means 2E is comprised by Step 3, and the detonation inhibition ignition timing arithmetical operation means 2F is comprised by Step 4. The allowable upper limit temperature arithmetical operation means 2M is comprised by Step 5, and the exhaust pipe temperature determination means 2N is comprised by Step 6. The detonation state ignition processing means 2J is comprised by Step 7, and the ignition operation stopping means 2K is comprised by Step 8.

Although the preferred embodiments of the invention have been described and illustrated with reference to the accompanying drawings, it will be understood by those skilled in the art that these are by way of example, and that various changes and modifications may be made without departing from the spirit and scope of the invention, which is defined only to the appended claims.

What is claimed is:

1. An ignition control method for a two-cycle internal combustion engine that performs detonation inhibition control for delaying an ignition timing of said internal combustion engine at occurrence of detonation in order to inhibit the occurrence of the detonation, wherein exhaust pipe temperature detection means for detecting an exhaust pipe temperature of said internal combustion engine is provided, a map is prepared that provides a relationship among a throttle valve opening degree and a rotational speed of said internal combustion engine and an allowable upper limit value of said exhaust pipe temperature, which is an upper limit value of an exhaust pipe temperature range that allows control to delay the ignition timing without abnormal increase in the exhaust pipe temperature, and while said detonation inhibition control is performed, an allowable upper limit temperature arithmetical operation step of arithmetically operating the allowable upper limit value of said exhaust pipe temperature is performed by searching said map with respect to the throttle valve opening degree and the rotational speed of said internal combustion engine, and an ignition operation of said internal combustion engine is stopped when an exhaust pipe temperature detected by said exhaust pipe temperature detection means exceeds the allowable upper limit temperature of the exhaust pipe temperature arithmetically operated in said allowable upper limit temperature arithmetical operation step.

2. An ignition control device for a two-cycle internal combustion engine comprising detonation inhibition control means for controlling to delay an ignition timing of said internal combustion engine at occurrence of detonation in order to inhibit the occurrence of the detonation, wherein said detonation inhibition control means comprises:

map storing means for storing a map that provides a relationship among a throttle valve opening degree and a rotational speed of said internal combustion engine and a delay side allowable limit ignition timing, which is a limit ignition timing on a delay side of said internal combustion engine when an exhaust pipe temperature of said internal combustion engine reaches an allowable upper limit value;

throttle valve opening degree detection means for detecting the throttle valve opening degree of said internal combustion engine;

rotational speed detection means for detecting the rotational speed of said internal combustion engine;

allowable limit ignition timing arithmetical operation means for arithmetically operating said delay side allowable limit ignition timing by searching said map with respect to the throttle valve opening degree detected by said throttle valve opening degree detection means and the rotational speed detected by the rotational speed detection means; and ignition operation stopping means for stopping an ignition operation of said internal combustion engine when the ignition timing of said internal combustion engine is further delayed from said delay side allowable limit ignition timing.

3. An ignition control device for a two-cycle internal combustion engine comprising detonation inhibition control means for controlling to delay an ignition timing of said internal combustion engine at occurrence of detonation in order to inhibit the occurrence of the detonation, wherein said detonation inhibition control means comprises:

exhaust pipe temperature detection means for detecting an exhaust pipe temperature of said internal combustion engine;

throttle valve opening degree detection means for detecting a throttle valve opening degree of said internal combustion engine;

rotational speed detection means for detecting a rotational speed of said internal combustion engine;

map storing means for storing a map that provides a relationship among the throttle valve opening degree and the rotational speed of said internal combustion engine and an allowable upper limit value of said exhaust pipe temperature, which is an upper limit value of an exhaust pipe temperature range that allows control to delay the ignition timing without abnormal increase in the exhaust pipe temperature of said internal combustion engine;

allowable upper limit temperature arithmetical operation means for arithmetically operating the allowable upper limit value of the exhaust pipe temperature of said internal combustion engine by searching said map with respect to the throttle valve opening degree of the internal combustion engine detected by said throttle valve opening degree detection means and the rotational speed detected by said rotational speed detection means; and ignition operation stopping means for stopping an ignition operation of said internal combustion engine when the exhaust pipe temperature detected by said exhaust pipe temperature detection means exceeds the allowable upper limit value arithmetically operated by said allowable upper limit temperature arithmetical operation means.

* * * * *